(12) United States Patent
Aesaert et al.

(10) Patent No.: US 10,194,585 B2
(45) Date of Patent: Feb. 5, 2019

(54) CLEANING LOSS SENSOR ARRANGEMENT FOR COMBINE HARVESTER

(71) Applicant: CNH Industrial America LLC, New Holland, PA (US)

(72) Inventors: Glenn Aesaert, Roeselare (BE); Dré W. J. Jongmans, Klundert (NL); Thomas Mahieu, Ypres (BE); Karel M. C. Viaene, Moorslede (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/519,081

(22) PCT Filed: Oct. 7, 2015

(86) PCT No.: PCT/EP2015/073154
§ 371 (c)(1),
(2) Date: Apr. 13, 2017

(87) PCT Pub. No.: WO2016/058890
PCT Pub. Date: Apr. 21, 2016

(65) Prior Publication Data
US 2017/0231156 A1    Aug. 17, 2017

(30) Foreign Application Priority Data

Oct. 14, 2014    (BE) .................................. 2014/0760

(51) Int. Cl.
*A01D 41/127* (2006.01)
*A01F 12/44* (2006.01)

(52) U.S. Cl.
CPC ..... *A01D 41/1273* (2013.01); *A01D 41/1276* (2013.01); *A01F 12/444* (2013.01); *A01F 12/448* (2013.01)

(58) Field of Classification Search
CPC .............. A01D 34/006; A01D 41/1273; A01D 41/1276; A01D 41/1271; A01D 41/127; A01F 12/44; A01F 12/444; A01F 12/448
(Continued)

(56) References Cited

U.S. PATENT DOCUMENTS 4,466,230 A    8/1984    Osselaere et al.
4,481,756 A    11/1984   Schartz
(Continued)

FOREIGN PATENT DOCUMENTS

DE    2753505 A1    6/1979
EP    1584225 A1    10/2005
(Continued)

*Primary Examiner* — Robert E Pezzuto
(74) *Attorney, Agent, or Firm* — Patrick M. Sheldrake; Peter K. Zacharias

(57) ABSTRACT

A harvesting vehicle including a cleaning section including a blower and at least one sieve. The sieve is configured to transport a layer comprising a mixture of grain kernels and residue material towards an exit edge of the sieve so that kernels fall through openings of the sieve and the residue remains on the sieve until it is ejected from the sieve by crossing the exit edge. The sieve may be subject to a grain loss, including a sieve-off loss and a blowout loss. The cleaning section further includes a sensor configured to determine whether the blowout loss or the sieve-off loss is a highest contributor to the grain loss. The cleaning section may also include a grain loss detector configured to measure the sieve-off loss and at least a portion of the blowout loss and a blowout sensor mounted above the sieve for measuring the blowout loss.

17 Claims, 4 Drawing Sheets

(58) Field of Classification Search
USPC ............... 56/10.2 A–10.2 F, 10.2 R; 460/1–6
See application file for complete search history.

(56) References Cited

U.S. PATENT DOCUMENTS

| | | | |
|---|---|---|---|
| 6,591,145 | B1 | 7/2003 | Hoskinson et al. |
| 7,362,233 | B2 | 4/2008 | Behnke et al. |
| 7,367,880 | B2 * | 5/2008 | Hoskinson ......... A01D 41/1271 |
| | | | 460/4 |
| 7,630,808 | B2 * | 12/2009 | Behnke ................ A01D 41/127 |
| | | | 56/10.2 F |
| 7,976,369 | B2 * | 7/2011 | Craessaerts ........... A01F 12/448 |
| | | | 460/6 |
| 8,469,784 | B1 * | 6/2013 | Hoskinson ........... A01D 41/127 |
| | | | 460/1 |
| 8,676,453 | B2 * | 3/2014 | Behnke .............. A01D 41/1276 |
| | | | 460/101 |
| 2013/0029734 | A1 | 1/2013 | Behnke et al. |

FOREIGN PATENT DOCUMENTS

| | | |
|---|---|---|
| EP | 2022312 A2 | 2/2009 |
| GB | 1468477 A | 3/1977 |
| WO | 2015/028437 A1 | 3/2015 |

\* cited by examiner

CLEANING LOSS SENSOR ARRANGEMENT FOR COMBINE HARVESTER

CROSS REFERENCE TO RELATED APPLICATION

This application is the National Stage of International Application No. PCT/EP2015/073154 filed Oct. 7, 2015, which claims priority to Belgian Application No. 2014/0760 filed Oct. 14, 2014, the contents of which are incorporated herein by reference.

FIELD OF THE INVENTION

The present invention is related to agricultural harvesting vehicles, such as combine harvesters, for gathering and processing crop material from a field, in particular to a harvester equipped with a sensor arrangement for monitoring losses of crop material in the cleaning section of the harvester.

STATE OF THE ART

Combine harvesters are equipped with threshing/separation means arranged for threshing harvested crops and separating a mixture of grains and smaller residue from the larger stalks and leaves of the crops, and with a cleaning section for further separating the grains from the residue. In many present day harvesters, the threshing and separation is done by a pair of longitudinally arranged threshing and separation rotors. The cleaning section comprises preparation means, for example a reciprocating grain pan, configured to deliver the grain/residue mixture to a set of sieves, usually an upper and a lower sieve, which are equally moving in a reciprocating motion. Grains fall through the sieves, while residue is blown towards the rear of the machine by a blower or collected at the end of the sieves where it is evacuated from the harvester by a chopper/spreader arrangement. The cleaning section is usually mounted underneath the threshing rotors, i.e. between the front wheels or tracks of the harvester.

An important factor in optimizing the throughput is the adequate measurement of parameters of the crop treatment process, in order to use the measured values as inputs for various control loops applied in the harvester. One important parameter is the loss of the actual grain kernels in the cleaning section. These grain kernels (hereafter also referred to simply as 'grains') are supposed to fall through the sieves as a mixture of grains and residue material passes through the cleaning section. Nevertheless, a percentage of grains is lost due to two main reasons: grains may become airborne and be blown through the cleaning section by the blower, together with light residue material, or grains may remain on the sieve without falling through the sieve openings. These grain losses are respectively referred to as blow-out loss and sieve-off loss.

Present day harvesters are equipped with a sieve loss sensor arrangement mounted downstream of the cleaning section. This is usually an impact plate with a piezo-electric transducer mounted on the plate, so as to register and count the impacts made by grains that fall onto the plate. The problem with this or any existing type of grain loss sensor arrangement is that it does not allow distinguishing between blowout loss and sieve-off loss. As these types of losses have different causes, it is desirable to be able to distinguish between the two. This would allow a better control of the operational parameters that are influencing the loss.

Document EP-A-2022312 describes a harvester equipped with four pressure sensors underneath the upper sieve. The sensor output is used to determine a sieve load estimator L which can be used as an indication of the total grain loss. No distinction is made however between blowout loss and sieve-off loss.

SUMMARY OF THE INVENTION

The present invention is related to an agricultural harvesting vehicle as disclosed in the appended claims. The present invention is in particular related to an agricultural harvesting vehicle, such as a combine harvester for gathering crops from a field and processing the crops in order to separate grain kernels from residue material such as stalks and leaves. The harvesting vehicle of the invention is provided with a cleaning section comprising a blower and at least one sieve, usually a set of an upper and lower sieve. The sieves are configured to transport a layer comprising a mixture of grain kernels and residue material towards an exit edge of the sieve so that kernels fall through the sieve's openings and residue remains on the sieve until it is ejected from the sieve by crossing the exit edge. The sieve may be subject to a grain loss, consisting of a sieve-off loss and a blowout loss, said losses being respectively due to grain kernels being ejected together with the residue across the exit edge, or becoming airborne and being blown out of the cleaning section by the blower. In a harvester according to the invention, the cleaning section is further equipped with sensing means configured to determine whether the blowout loss or the sieve-off loss is the highest contributor to the total grain loss. The sensing means may further be equipped with a grain loss detector configured to measure the sieve off loss and at least a portion of the blowout loss. The invention is in particular related to embodiments wherein the sensing means is configured to measure a differential pressure obtained by a suitable pressure sensing configuration or a measurement of the blowout loss, relative to the total grain loss or to the sieve-off loss, by an impact sensor mounted above the sieve.

DETAILED DESCRIPTION OF PREFERRED EMBODIMENTS OF THE INVENTION

Figure 1A:
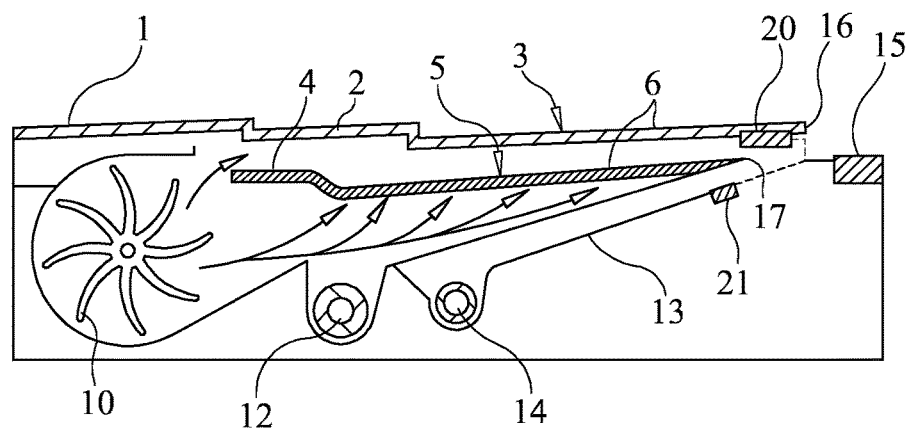
FIGS. 1a and 1b show side and top views of the cleaning section of a harvester according to a first embodiment of the invention.
Figure 1B:
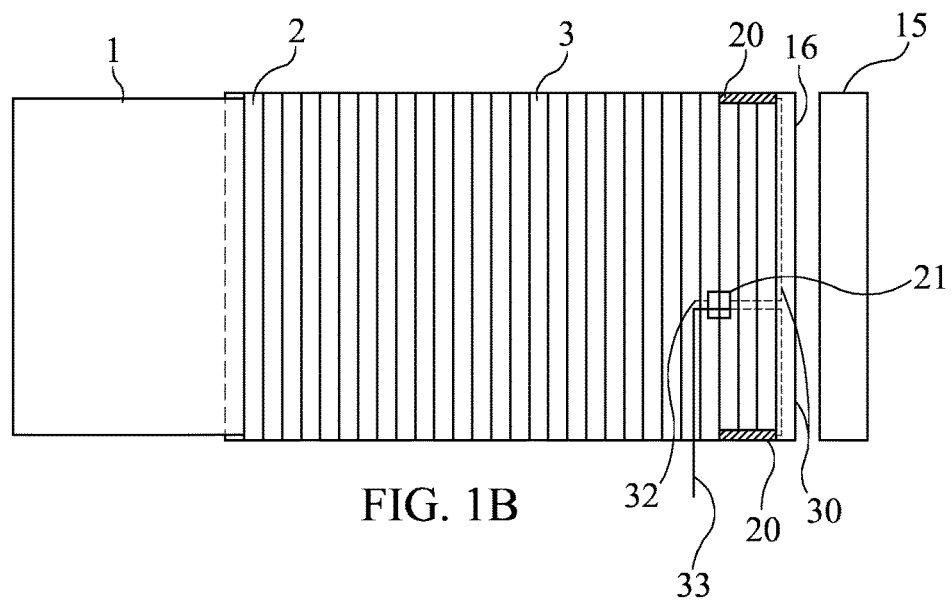

Preferred embodiments will now be described with reference to the drawings. The detailed description is not limiting the scope of the invention, which is defined only by the appended claims. FIGS. 1a and 1b show a side and top view of the cleaning section of a combine harvester according to the invention. Only the cleaning section as such is shown; the harvester as a whole is known per se in the art. The direction of movement of the harvester is to the left. A mixture of grain kernels and residue material, the latter being often referred to as 'MOG' (material other than grain), falls from the threshing rotors (not shown) onto a grain pan 1, from which it advances in the direction opposite the harvester's direction of movement, preferably driven onwards by a reciprocating movement of the pan 1, towards a first sieve 2, and on to the main upper sieve 3. Material falling through the first sieve 2 is received by a second grain pan 4, which delivers it to the lower sieve 5, which extends underneath the greater portion of the surface of the main upper sieve 3 (hereafter simply referred to as 'upper sieve'). The sieves are preferably moving the mixture onwards by way of a reciprocating movement, possibly coupled to the movement of the pan 1, in a manner that is in itself known in the art. A cleaning section according to the invention comprises at least one sieve. Most cleaning systems are however provided with an upper sieve 3 and a lower sieve 5, arranged with respect to each other in the manner shown in the figures. The invention will be described with respect to the upper sieve 3, but may be applied as well to the other sieves in a multiple sieve cleaning section.

All sieves are preferably provided with rotatable lamellae 6 extending transversally with respect to the direction of travel of the mixture, and which can be rotated so as to control the size of the sieve openings through which material is allowed to fall. A blower 10 is mounted so as to produce a flow of air, the air passing between the lamellae of the sieves, from the area below a sieve to the area above it. The air flow works against the compacting of the advancing layer of MOG and grain kernels on the sieves, and at the same time this air flow blows dust and light MOG towards the end of the cleaning section.

Underneath the lower sieve 5 is a grain slide which transports grain kernels that have fallen through the sieve openings to an auger 12 which transports the kernels transversally with respect to the harvester's travel direction towards a grain elevator (not shown but known to the skilled person). At the end of the lower sieve 5, a mixture of MOG and a percentage of non-sieved kernels is delivered to a MOG slide 13, leading to a second auger 14 from where the mixture is sent back to the entrance of the cleaning section. At the end of the upper sieve 3, a mixture of MOG and grain kernels is delivered to the MOG treatment section of the harvester, which is not shown in detail but which may be implemented according to known technology. This MOG treatment section usually comprises spreading rotors for spreading out residue material evenly over the field behind the advancing harvester.

Figure 1C:
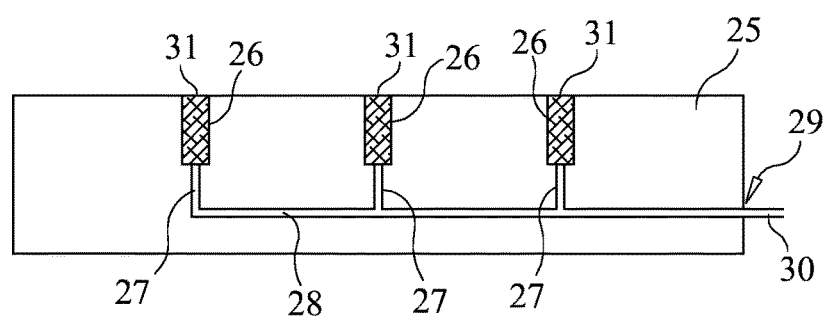
FIG. 1c shows a detail of a pressure pickup according to a preferred embodiment.

The stream of material that crosses the exit edge 16 of the upper sieve 3 falls onto a standard grain loss detector 15. This is a sensor arrangement known in the art and arranged to measure the grain loss at the end of the cleaning section, in other words the number of grain kernels (preferably expressed as a number of kernels per unit time) that have failed to fall through the openings of the upper sieve 3. The grain loss detector 15 is configured to detect kernels that are lost due to the sieve-off loss and at least a portion of the kernels that are lost due to the blowout loss. The grain loss detector 15 may comprise an impact plate mounted parallel to the exit edge 16 of the upper sieve, so that the mixture exiting from the upper sieve 3 falls onto the impact plate. The impact plate and cleaning section as such are configured so that at least a percentage of the kernels that are blown out together with light MOG (i.e. blowout loss) also fall onto the impact plate. A piezo-transducer (not shown) mounted in contact with and preferably on the bottom face of the impact plate detects the impacts made by grain kernels onto the top face of the plate, and electronic measuring equipment is provided for registering and counting these impacts. The term '(standard) grain loss detector 15' used in the present description and in the appended claims refers to a configuration that comprises one or more sensors, for example one or more impact plates as shown in FIGS. 1a-1c, configured to measure the sieve loss and at least a portion of the blowout loss of a particular sieve and provide an output that is indicative of the total grain loss.

As stated in the introduction, this known grain loss detection is not capable of detecting whether the total grain loss is mainly due to sieve-off losses or to blowout loss. The present invention is related to a harvester equipped with a sensing means for detecting whether the total grain loss of a sieve is due mainly to blowout loss or to sieve-off loss. When a standard grain loss detector 15 is present in the harvester, said detector is part of the sensing means. According to a preferred embodiment, the sensing means is capable of determining or at least estimating the relative contribution of the sieve-off loss and the blowout loss to the total grain loss.

In the context of this invention, the terms 'total grain loss', 'sieve-off loss' and 'blowout loss' are defined with respect to a particular sieve. The total grain loss of a sieve is defined as the sum of the sieve-off loss and the blowout loss related to that sieve, in other words, the total grain loss consists of a percentage of blowout loss and a percentage of sieve-off loss, the sum of the two percentages equaling 100%. This means that determining or estimating the total grain loss and at least one of the blowout and sieve-off loss allows to determine whether the sieve-off loss or the blowout loss is the highest contributor to the total grain loss. Likewise, determining the sieve-off loss and the blowout loss separately allows also determining the total grain loss, as well as allowing to determine which of the two is the dominant contributor.

In a first embodiment according to the invention illustrated in FIGS. 1a and 1b, a pair of pressure sensors 20 is mounted underneath the upper sieve 3, in the vicinity of the exit edge 16 of the sieve. The sensors are mounted close to the side edges of the upper sieve 3, and downstream of the lower sieve's exit edge 17 ('downstream' being used with reference to the direction of travel of a MOG/grain mixture in the cleaning section).

These pressure sensors 20 are part of a pressure sensing configuration that measures at the sensor locations the differential air pressure, i.e. the difference between the pressure at the sensor locations and a reference pressure. The reference may be the pressure of still air at atmospheric pressure. One possible setup for obtaining this pressure measurement is described hereafter, still with respect to FIGS. 1a, 1 b and 1c.

In the embodiment of FIGS. 1a-1c, the pressure sensing configuration further comprises a central electronic measurement unit 21, placed centrally at a reference location, for example underneath the MOG slide 13, where the wind speed may be expected to be low. The sensors 20 themselves in this particular embodiment are better described as pressure pickups, as they do not comprise the actual pressure measurement hardware, but are primarily devices for channelling the air at the pressure that is to be measured, towards the measurement unit 21, which does comprise said measurement hardware. A detail of one pickup 20 that is especially suitable for the invention is shown in FIG. 1c. The pickup is produced as a longitudinal beam-shaped element 25, with a plurality of transversal access channels 26 provided in the body of the beam-shaped element. The element is mounted at the side of the cleaning section so that the channels 26 are facing the interior of the cleaning section. Inside the element, air channels 27 are formed which connect the access channels 26 to a longitudinal channel 28 that leads to the outlet opening 29 of the pickup element. From there an air tube 30 leaves the pickup and connects it to the central measurement unit 21. The access channels 26 may be filled with a ceramic porous insert 31 that acts as a damping means for reducing pressure readings that are primarily due to air speed at the location of the pickup. In this way, a stable measurement of the static pressure at the pickup location becomes possible. The air that enters the air channels is thus at this static pressure which is to be measured in the measurement unit 21. This may be a standard unit available from known suppliers, and capable of measuring a small differential pressure, in the order of 0-50 Pa, between the pressure at the location of the pickups 20 and the reference pressure. As seen in FIG. 1b, the measurement unit 21 in this particular embodiment thus comprises three air pressure inlets, one for each pickup 20, and a third inlet 32 for the reference pressure. The reference pressure may be measured at the location of the measurement unit itself, or at another location connected to the measurement unit via an air tube. In the embodiment shown, the reference location is the location of the measurement unit itself. A suitable type of measurement unit is available from the supplier SensorTechnics. An electric cable 33 exits the measurement unit, carrying a signal that is proportional to the measured differential pressure to an electronic processing device, not shown in the drawings and known per se in the art.

Figure 2:
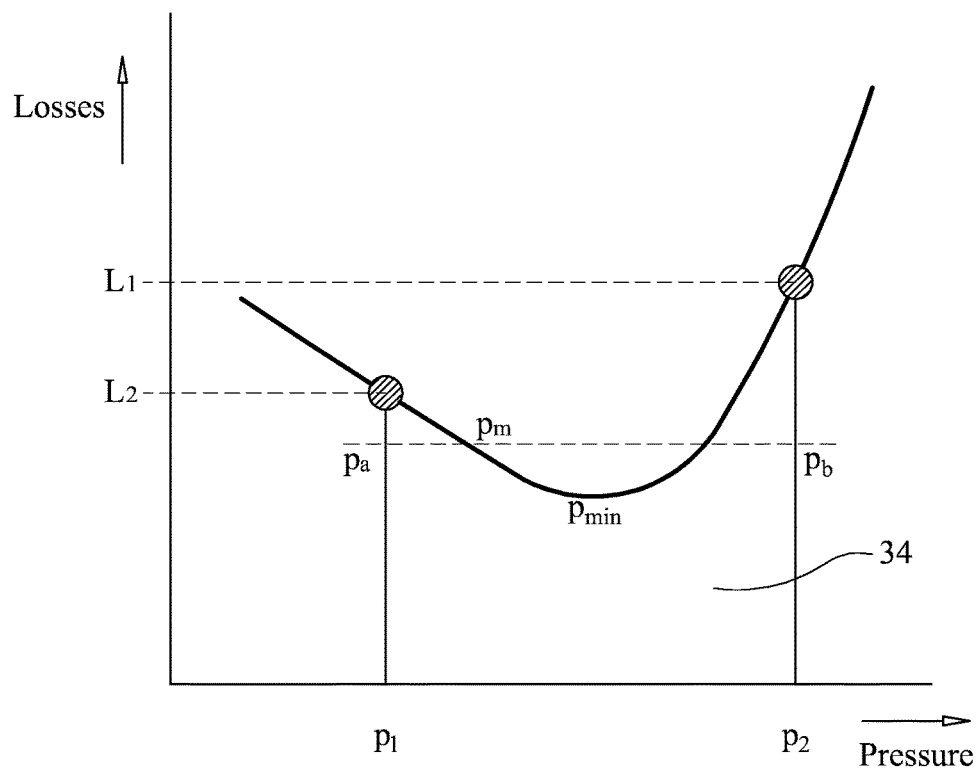
FIG. 2 shows a typical graph of the total grain loss as a function of the pressure measured by a pressure sensor in a pressure sensing configuration according to the invention.

The differential pressure obtained from each pressure pickup 20 may be evaluated separately or the two signals may be combined to a single signal, e.g. by taking the average or the sum of the two. FIG. 2 shows a typical measurement curve of the total grain loss as a function of the output of one of the pressure pickups 20, i.e. the differential pressure at the measurement location with respect to the reference. The total grain loss is measured by the standard grain loss detector 15 and expressed for example as the number of kernel impacts on the impact plate of the grain loss detector 15 per unit time. Even when the grain loss detector 15 measures only a portion of the blowout loss, the output of the grain loss detector can be used for determining the curve of FIG. 2, as this output will in any case be directly related to the actual total grain loss.

As seen in FIG. 2, the curve exhibits a minimum. Excessive grain loss is thus related to either a pressure reading that is too low or too high. A high pressure indicates that the grain loss is mainly due to sieve-off losses: a dense layer of the MOG/grain mixture is forming on the sieve, causing an increase of pressure underneath the sieve, as air from the blower 10 fails to pass through the sieve openings. The dense layer carries with it an amount of grain kernels that fail to reach the bottom of the layer and which are therefore evacuated together with the MOG. When the pressure is too low, this indicates that the air flowing through the sieve openings meets insufficient resistance from the MOG/grain layer, so that grain kernels become airborne and are blown out beyond the exit edge 16 of the sieve 3. In other words, the grain loss is mainly due to blowout loss. The pressure sensing configuration in a harvester of the invention is configured in such a way that the curve relating the total grain loss to the measured pressure exhibits a clearly defined minimum, in the manner shown in FIG. 2. This can be achieved by a number of factors, one of which being the choice of a suitable location of the sensor pickups 20 in the direction of travel of the mixture within the cleaning section. Measuring too much upstream will generally result in high pressure readings regardless of the grain loss, given that the MOG/grain layer is thicker when it begins its advance on the sieve. Measuring too far downstream will result in low pressure readings regardless of the grain loss. Another aspect is the type of pressure measurement, which is preferably the above-described differential pressure measurement given that this measurement is very sensitive to changes in the conditions that determine the grain loss. Also the type of sensors and pressure pickups and the location of the pressure and reference pressure measurements may be of influence. Preferred embodiments of the pressure pickup 20 and reference unit 21 have been described above. Further embodiments, particularly of the location of the reference measurement and the number of said references to be applied, will be described hereafter.

When the grain loss curve of FIG. 2 is established on a harvesting machine by performing a number of tests in various circumstances, this curve may be used to determine whether an excessive grain loss is due mainly to blowout loss or to sieve-off loss. Around the minimum, a zone may be defined by defining critical levels $L_1$ and $L_2$ of the total grain loss. Alternatively, a single critical level may be defined. The zone 34 is situated between a lower and a higher pressure level $p_1/p_2$ respectively and represents a total grain loss that is acceptable, i.e. lower than either of the levels $L_1$ and $L_2$. When the total grain loss, as measured by the grain loss detector 15, exceeds at least one of the critical levels, the pressure reading indicates whether the loss is mainly due to blowout loss (when $p<p_1$) or to sieve-off loss (when $p>p_2$).

The above method of determining—by comparing the pressure reading with predefined fixed levels $p_1$ and $p_2$—whether or not an excessive total grain loss is mainly due to blowout loss or sieve-off loss, may not be possible in all circumstances. The values of $p_1$ and $p_2$ may for example depend on weather conditions and crop type or humidity. When $p_1$ and $p_2$ are not clearly known, the differential pressure that is measured when the total grain loss exceeds a critical value may be compared to a single value, for example a value of the differential pressure measurement or an average of differential pressure measurements obtained when the grain loss is below the critical value(s). When the differential pressure (measured when the total loss is above critical) is below the single value, the loss is concluded to be mainly due to blowout loss. When it is above the single value, the loss is concluded to be mainly due to sieve-off loss.

According to an embodiment, the sensing means is capable not only of estimating whether the total grain loss is due mainly to blowout loss or to sieve-off loss, but equally to determine or at least estimate on the basis of the output of the pressure sensing configuration 20/21 and the output of the grain loss detector 15, the relative contribution of the blowout loss and of the sieve-off loss to the total grain loss. These contributions could for example be derived from the location of the measurement point on the curve of FIG. 2, provided that the curve is known to be representative for the actual conditions in which the harvester is operating. A measurement point $p_m$ for example (see FIG. 2) indicates a point where the total grain loss is lower than the critical values, but where clearly blowout loss contributes more to the total grain loss than sieve-off loss. An estimation of the percentage of blow-off loss and sieve-off loss can be made from the lengths of the lines $p_m p_b$ and $p_a p_m$ relative to the line $p_a p_b$. The relative contributions can be used for fine-tuning the cleaning arrangement, even when the total grain loss is below the critical value(s).

When the curve of FIG. 2 is reliably known, the standard grain loss sensor 15 is not strictly required and may be omitted. The measured pressure difference may then simply be compared to the limit values p1 and p2 in order to determine whether the total grain loss is excessive or not. When p<p1 it is concluded that the total grain loss is excessive and due mainly to blowout loss, and when p>p2 it is concluded that the grain loss is excessive and mainly due to sieve-off loss. When p is between p1 and p2, the total grain loss may be concluded to be acceptable. When the estimation of the contributions $p_a p_m$ and $p_m p_b$ of the sieve-off loss and the blowout loss is reliable, the total grain loss (below or above the limit values $L_1/L_2$) can be determined as the sum of the two contributions. As an alternative or in addition to working with the limit values p1 and p2 for the differential pressure, the differential pressure measurement (s) may be compared to the minimum value $p_{min}$ (see FIG. 2), with blowout loss being the main contributor to the total grain loss when $p<p_{min}$ and sieve-off loss being the main contributor when $p>p_{min}$. As stated above, the reference measurement 21 can be done at other locations instead of the one shown in the drawings. Also, a plurality of reference locations may be applied, for example one for each pressure measurement. According to one embodiment, the reference location is a location outside the cleaning section, where the wind speed is minimal. According to one specific embodiment, the reference location is a location where the wind speed is similar to the measurement location. The feature 'wind speed similar to the measurement location' is a physical feature of the harvester, and depends on the structural characteristics of the vehicle and the area where the various sensors are installed. It can be verified by doing wind speed measurements at various locations for example. The fact that the influence of wind on the measurement and on the reference is similar, results in a differential measurement wherein the influence of the wind is minimised.

Figure 3:
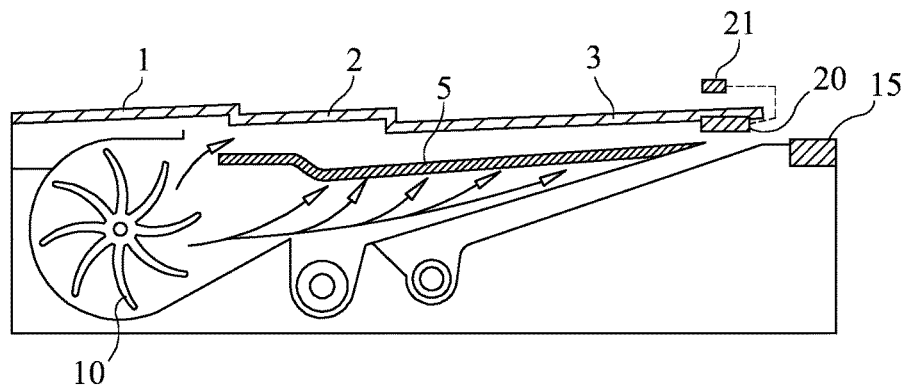
FIG. 3 illustrates the location of a reference pressure measurement above the sieve.

Preferred reference locations that face similar wind speed conditions as the measurement location(s) are found above the upper sieve 3, as illustrated in FIG. 3. The reference location is illustrated by the location of the measurement unit 21, even though it is not required that this unit is physically present at this location. An air tube could connect a pressure pickup 20 that is mounted at the reference location, to the measurement unit 21 that is mounted elsewhere and connected to the pressure pickup via an air tube. Suitable physical attachment means are provided for attaching the unit 21 and/or a pressure pickup 20 above the sieve and attached for example to the ceiling of the cleaning section.

Figure 4:
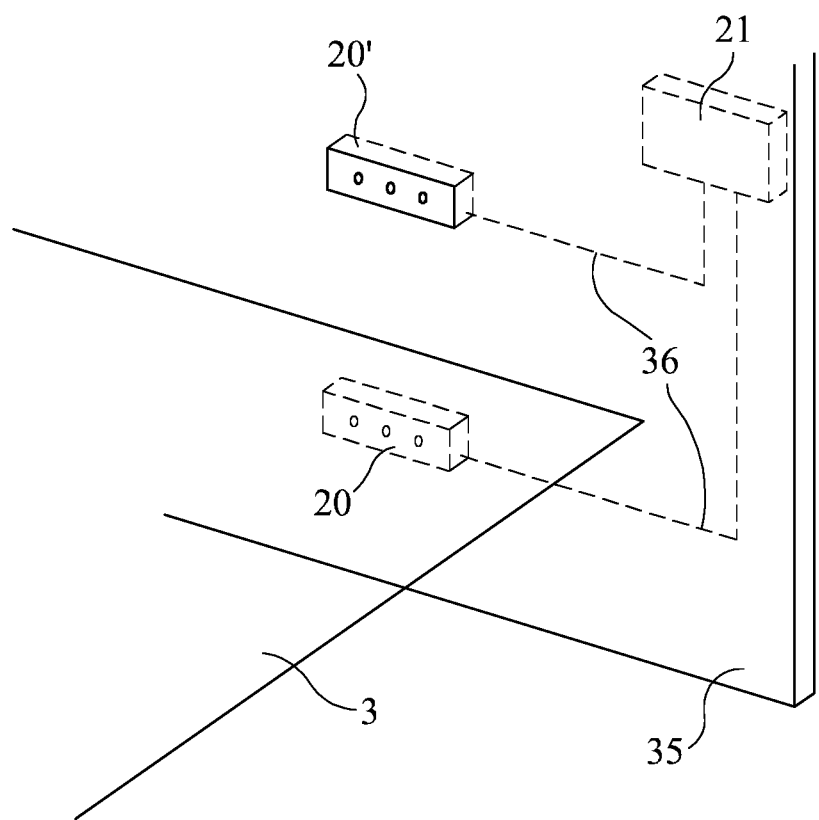
FIG. 4 illustrates a preferred embodiment of a pressure sensing configuration according to the invention.

The exact reference location yielding the minimum wind speed influence may depend on structural details of the cleaning section, as well as on the type of sensors or pressure pickups used. One preferred setup is illustrated in FIG. 4, which shows one side of the upper sieve 3. Also visible is the sidewall 35 of the cleaning section. A pressure pickup 20 is mounted underneath the upper sieve 3 as in the embodiment of FIGS. 1a-1c. A second pick up 20' is mounted above the upper sieve 3. Preferably, the lower pickup 20 and the upper pickup 20' are of the filter block type shown in FIG. 1c. Preferably, these filter blocks are incorporated into the sidewall 35 of the cleaning section, i.e. the inlet sections of the filter elements 31 in the filter blocks are flush with the sidewall, as illustrated in FIG. 4. The filter block 20' mounted above the sieve defines the location where the reference measurement is done. The upper and lower filter block 20/20' are connected via air tubes 36 to a measurement unit 21 that may for example be mounted on the back side of the side wall 35. On the opposite side of the sieve 3 (not shown), another pair of pressure pickups 20/20' is mounted in the same way, connected via air tubes to another measurement unit 21, i.e. a separate measurement unit 21 is provided on each side of the sieve 3. This ensures reliability of the measurement on both sides of the sieve, in terms of the minimization of the influence of wind, as explained above. The pickups 20/20' could alternatively be connected to the sieve itself, provided that the sieve is structurally suitable for mounting the pickups at the same location as illustrated in FIG. 4, with respect to the sieve's supporting surface.

Figure 5A:
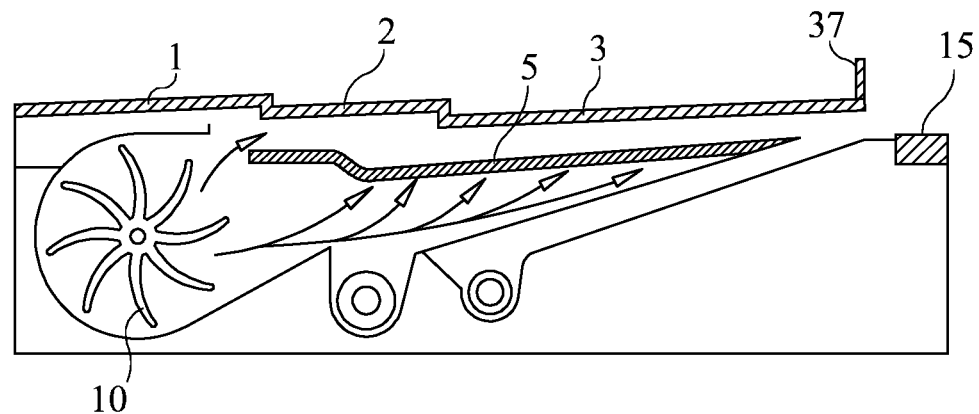
FIGS. 5a and 5b show side and top views of the cleaning section of a harvester according to a second embodiment of the invention.
Figure 5B:
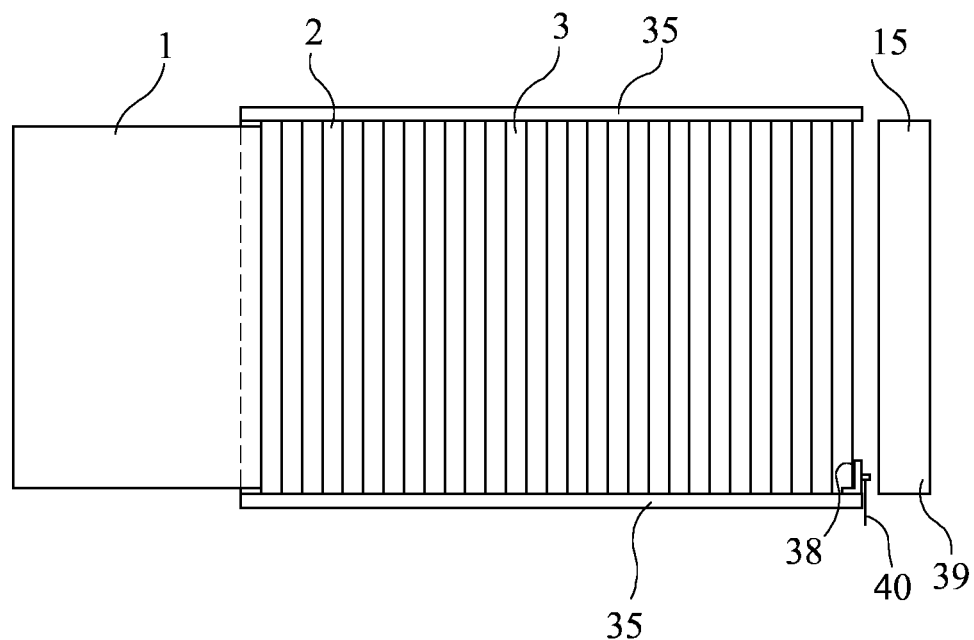

According to a second embodiment, illustrated in FIGS. 5a-5b, the cleaning section is equipped with one or more impact sensors 37 mounted above the upper sieve 3, in the vicinity of the exit edge 16 of the sieve, either aligned with this exit edge or slightly upstream or downstream of the exit edge. These impact sensor or sensors are mounted in a suitable location for detecting the presence of grain kernels that are airborne at the sensor location, and that are therefore necessarily contributing to the blowout loss. The number of impacts detected per unit time is a measure of the blowout loss as such. Hence these sensors 37 are hereafter referred to as blowout sensors. In the embodiment, of FIGS. 5a-5b, the blowout sensor or sensors 37 are present in addition to the standard grain loss detector 15 mounted at the end of the upper sieve 3. According to one embodiment, the grain loss detector 15 is configured to actually detect essentially all of the kernels that are lost by the blowout loss effect. In other words, the kernels that are detected by the blowout sensor(s) 37 eventually fall onto the grain loss detector 15 as well, so the combination of the two signals (from blowout sensor(s) on the one hand and standard detector 15 on the other) allows to determine whether an excessive grain loss is due primarily to blowout losses or to sieve-off losses. This can be done by monitoring the total grain loss with the standard loss detector 15, and determining the contribution of the blowout loss to this total grain loss on the basis of the output of the blowout sensor or sensors 37. Possibly, this determination is done only when the total grain loss exceeds a predetermined critical value. The output of the blowout sensor(s) 37 and of the standard detector 15 may be obtained as a number of kernel impacts per unit time. Taking into account the surface area of the impact plates of the blowout sensor(s) and the standard detector 15, with respect to the width of the cleaning section, the results may be calculated to obtain the blowout loss and the total grain loss in terms of a number of kernels per unit time. It is then verified whether the blowout loss represents more or less than 50% of the total grain loss, at which point appropriate control action can be taken (preferably only when the total grain loss exceeds a predetermined critical value).

In another embodiment comprising the blowout sensor(s) 37, the standard grain loss detector 15 measures the sieve-off loss and only a percentage of the blowout loss, for example because the impact plate is not positioned in a manner that it is assured to receive all of the kernels blown out of the cleaning section. In this case, the output of the grain loss detector 15 cannot be used in the above manner to numerically determine or estimate the contribution of the blowout loss to the total grain loss. However, the blowout sensor still delivers an estimation of the blowout loss as such, and in most circumstances, for example when the difference between the output of the blowout sensor(s) 37 and the grain loss sensor 15 is very high or very low, the outputs will still allow to determine whether the blowout loss or the sieve-off loss is the highest contributor to the total grain loss.

In another embodiment, the harvester is equipped with the blowout sensor(s) 37 and with a detector that measures essentially only the sieve-off loss. The latter can be an impact plate placed downstream of the sieve, but positioned in such a way that the kernels that are blown out of the cleaning section do not impact said plate. This may further be achieved by designing the cleaning section in such a way that the blown-out kernels are guided away from this impact plate. In this embodiment, the blowout sensor(s) 37 and the sieve-off detector provide separate measurements of the blowout loss and the sieve-off loss respectively, which equally allows determining which of the two is the largest contributor to the total grain loss. In the latter embodiment, the harvester does not comprise a 'standard grain loss detector' as defined above, as it comprises a means to determine the blowout loss and the sieve-off loss separately.

The advantage of the embodiments comprising one or more blowout sensors 37 is that the contributions of the blowout loss and sieve off loss as such or at least estimations thereof are readily available or can be easily calculated, so that it is easier to perform fine-tuning of the cleaning section on the basis of the output of the sensing configuration, even when the total grain loss is below a critical value.

One preferred location for a blowout sensor 37 is shown in the top view shown in FIG. 5b. In this embodiment the sensor is mounted on a side wall 35 of the cleaning section. The sensor is advantageously produced in the form of an impact plate 38 that is vertically mounted against the side wall 35, with the face of the plate perpendicular to the direction of travel of the MOG/grain mixture in the cleaning section. A piezo-transducer 39 is connected at the back of the plate 38 in order to register the impacts and send related signals via a cable 40 to a processing device, in the manner that is known per se for the grain loss detector 15 described above. One blowout sensor 37 of this type may suffice but a second sensor may be placed on the opposite side of the sieve 3. The combined signals of these two sensors may provide a more accurate estimation of the blowout loss in the case of a MOG/grain mixture layer that is unevenly spread across the width of the upper sieve 3. Another possibility is to mount one impact plate horizontally above the centre of the sieve, possibly even extending over the whole width of the sieve.

In any of the above described embodiments, the harvester further comprises a means for determining whether blowout or sieve-off losses dominate the total grain loss and (if possible) how much each is contributing. These means may comprise any suitable signal acquisition and treatment equipment, configured to compare measured parameters (e.g. differential pressure measurements or number of impacts on the blowout sensor 37) to predefined limit values and to calculate and deliver results to a controller configured to control the grain loss by acting on one or more machine parameters (see further) and possibly to a suitable output device such as a computer screen.

Any of the sensing configurations described above with respect to the upper sieve 3 may be applied as well to the lower sieve 5 or to any additional sieve present in the cleaning section. As stated, the terms 'grain loss', 'sieve-off loss' and blowout loss' are to be understood in relation to a particular sieve, namely as the amount of grain kernels in a grain/MOG mixture advancing on the sieve, that fail to fall through the sieve openings, and are thus carried off beyond the sieve's exit edge, either by being blown out, or by remaining in the grain/MOG layer. In the cleaning section of FIG. 1a, the 'grain loss' of the lower sieve 5 is not a grain loss of the harvester as such, given that the majority of the lower sieve's loss is recycled via the MOG slide 13 and return auger 14. The sensing arrangement of the invention, when applied to the lower sieve 5, thus provides a way of monitoring and controlling the amount of grain returned to the start of the cleaning section. This is useful as it allows avoiding blockages in the return path due to excessive 'losses' of the lower sieve 5.

Regardless of whether pressure sensors or impact sensors are used, the output of a sensing configuration according to the invention may be used as input to a process for controlling operational parameters of the harvester. Said output may be a signal that signifies simply that excessive grain loss is taking place, the signal having a first value when the grain loss is due mainly to blowout loss (e.g. p<p1) and a second value when the grain loss is mainly due to sieve-off loss (e.g. p>p2). In addition, the output could be more specific and specify an estimated contribution (e.g. a percentage) of blowout loss and of sieve-off loss to the total grain loss. The main parameters that have an impact on the grain loss are the blower speed and the sieve openings of the sieve, the latter being controlled by controlling the position of the rotatable lamellae 6. For example, when the blowout loss becomes too important, this may be remedied primarily by decreasing the blower speed and/or by decreasing the sieve openings of the sieve. When the sieve-off loss becomes too important, this may be remedied by increasing the blower speed and/or by increasing the sieve openings. It is clear therefore that different actions are required when either the blowout loss or the sieve-off loss is the dominant contributor to the total grain loss. The present invention allows determining which actions are the most appropriate actions to be taken in order to minimize the loss at any time during operation of the harvester. The parameters that are controlled are not necessarily limited to the blower speed and upper sieve openings, but may include other machine parameters, e.g. the speed of the reciprocating movement of the sieves. The precise control algorithm that may be used on the basis of the measurements obtained from the pressure sensing configuration 20/21 or the blowout sensor(s) 35 combined with the output of the standard grain loss sensor 15 is not a part of this specification and may involve known procedures and schemes, similar for example to the fuzzy logic approach disclosed in EP2022312.

The method for controlling the grain loss of a sieve in the cleaning section of a harvesting vehicle according to the invention comprises the steps of:

determining on the basis of the output of the sensing means, the value of a parameter related to the blowout loss and the sieve-off loss, determining on the basis of the measured parameter whether the grain loss is mainly due to blowout loss or to sieve off loss, by comparing the measured parameter to one or more limit values.

In the case of the differential pressure embodiments, the parameter may be the differential pressure at one measurement location or an average or sum of differential pressures at several measurement locations. The limit values may be the values $p_1+p_2$ and/or $p_{min}$. In the blowout sensor embodiments, the parameter may be the ratio of the output of the blowout sensor 37 to the output of the standard grain loss sensor 15 configured to measure the total grain loss, said ratio being compared to the limit value of 50%, or the ratio of the output of the blowout sensor 37 to the output of a sensor configured to measure only the sieve-off loss, the limit value being 1.

The invention claimed is:

1. A cleaning section of an agricultural harvesting vehicle, the cleaning section comprising:
   a blower;
   at least one sieve having sieve openings, the blower being configured to produce an air flow through the sieve openings from an area below the at least one sieve to an area above the at least one sieve, the at least one sieve configured to transport a layer comprising a mixture of grain kernels and residue material towards an exit edge of the at least one sieve so that kernels fall through the openings of the at least one sieve and residue remains on the at least one sieve until it is ejected from the at least one sieve by crossing the exit edge, the at least one sieve being be subject to a total grain loss, consisting of a sieve-off loss and a blowout loss, the losses being respectively due to grain kernels being ejected together with the residue across the exit edge, or becoming airborne and being blown over the exit edge by the blower; and
   a sensing system comprising a sensor configured to provide a first output and a grain loss detector configured for measuring a grain loss consisting of the sieve-off loss and at least a portion of the blowout loss and providing a second output indicative of the total grain loss, the sensing system configured to:
      determine, based on the first output of the sensor, a parameter related to the blowout loss and the sieve-off loss, and
      determine, based on the parameter, whether the blowout loss or the sieve-off loss is a highest contributor to the total grain loss.

2. The cleaning section according to claim 1, wherein the sensor comprises a pressure sensing configuration, configured to measure a pressure difference between an air pressure at a measurement location underneath the at least one sieve and an air pressure at a reference location.

3. The cleaning section according to claim 2, wherein the reference location is a location outside the cleaning section.

4. The cleaning section according to claim 2, wherein the reference location is a location above the at least one sieve.

5. The cleaning section according to claim 2, wherein the sensing system further comprises one or more measurement units, wherein the pressure sensing configuration comprises one or more pressure pickups, connected via external air tubes to the one or more measurement units, wherein the one or more pickups are mounted at the measurement location or at the reference location, the one or more pickups comprising one or more access channels oriented transversally with respect to a transport direction of the mixture of grain kernels and residue material, the one or more access channels being interconnected through respective one or more internal air tubes in an interior of the one or more pickups, the one or more internal air tubes being connected to one or more external air tubes connecting the one or more pickups to the one or more measurement units.

6. The cleaning section according to claim 5, wherein each of the one or more access channels is at least partially filled with a porous insert.

7. The cleaning section according to claim 5, wherein the at least one sieve is mounted between sidewalls of the cleaning section, and wherein the sensor comprises:
   a first pickup mounted at a first location underneath the at least one sieve,
   a second pickup mounted at a second location above the at least one sieve, and
   the one or more measurement units, configured to measure the pressure difference between the first and second locations,
   wherein the first and second pickups are connected via air tubes to the one or more measurement units.

8. The cleaning section according to claim 7, wherein each of the first and second pickups is attached to one of the sidewalls.

9. The cleaning section according to claim 5, wherein the one or more pressure pickups comprise a plurality of pressure pickups, and wherein the one or more measurement units comprises a central measurement unit for the plurality of pressure pickups.

10. The cleaning section according to claim 9, wherein the one or more pickups comprises two pickups mounted on opposite sides of the at least one sieve, near the exit edge of the at least one sieve.

11. The cleaning section according to claim 2, wherein the reference location is a location where wind speed conditions are similar to the measurement location.

12. The cleaning section according to claim 1, wherein the sensing system comprises:
   one or more impact sensors mounted above the at least one sieve, so as to register impacts made by grain kernels that are contributing to the blowout loss.

13. The cleaning section according to claim 1, wherein the sensing system further comprises:
   one or more impact sensors mounted above the at least one sieve, so as to register impacts made by grain kernels that are contributing to the blowout loss, and
   a detector configured to measure the sieve-off loss.

14. The cleaning section according to claim 12, wherein the one or more impact sensors comprise:
   an impact plate mounted on a sidewall of the cleaning section, in the vicinity of the exit edge of the at least one sieve, the impact plate facing a transport direction of the mixture of grain kernels and residue material on the at least one sieve, and
   an impact transducer mounted on the impact plate.

15. A method for controlling a cleaning section of an agricultural harvester, the cleaning section comprising a blower, and at least one sieve having sieve openings, the blower being configured to produce an air flow through the sieve openings from an area below the at least one sieve to an area above the at least one at least one sieve, the at least one sieve configured to transport a layer comprising a mixture of grain kernels and residue material towards an exit edge of the at least one sieve so that kernels fall through the openings of the at least one sieve and residue remains on the at least one sieve until it is ejected from the at least one sieve by crossing the exit edge, the at least one sieve being be subject to a total grain loss, consisting of a sieve-off loss and a blowout loss, the losses being respectively due to grain kernels being ejected together with the residue across the exit edge, or becoming airborne and being blown over the exit edge by the blower, the cleaning section further comprising a sensing system comprising a sensor configured to provide a first output and a grain loss detector configured for measuring a grain loss consisting of the sieve-off loss and at least a portion of the blowout loss and providing a second output indicative of the total grain loss, the method comprising the steps of:
   determining, based on the first output of the sensor, a parameter related to the blowout loss and the sieve-off loss, determining, based on the parameter, whether the total grain loss is mainly due to the blowout loss or to the sieve-off loss, by comparing the parameter to one or more limit values, and if required, acting on one or more operational conditions of the cleaning section in order to control the total grain loss.

16. The method according to claim 15, further comprising the step of determining contributions of the blowout loss and the sieve-off loss to the total grain loss.

17. The method according to claim 15, wherein the sensor comprises a pressure sensing configuration, configured to measure a pressure difference between an air pressure at a measurement location underneath the at least one sieve and an air pressure at a reference location, wherein the parameter is the pressure difference, the method further comprising steps of:

determining that the grain loss is mainly due to blowout loss if the measured pressure difference is below a first limit value, and determine that the grain loss is mainly due to sieve-off loss if the measured pressure difference is above a second limit value.

* * * * *